(12) United States Patent
Park

(10) Patent No.: US 12,079,165 B2
(45) Date of Patent: *Sep. 3, 2024

(54) METHOD AND APPARATUS FOR PROVIDING SEARCH FUNCTION IN TOUCH-SENSITIVE DEVICE

(71) Applicant: Samsung Electronics Co., Ltd., Gyeonggi-do (KR)

(72) Inventor: Sehwan Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,992

(22) Filed: Sep. 29, 2022

(65) Prior Publication Data

US 2023/0027759 A1 Jan. 26, 2023

Related U.S. Application Data

(63) Continuation of application No. 17/205,658, filed on Mar. 18, 2021, now Pat. No. 11,461,271, which is a
(Continued)

(30) Foreign Application Priority Data

Oct. 17, 2011 (KR) .................. 10-2011-0105795

(51) Int. Cl.
*G06F 3/04817* (2022.01)
*G06F 3/023* (2006.01)
(Continued)

(52) U.S. Cl.
CPC ............ *G06F 16/14* (2019.01); *G06F 3/0237* (2013.01); *G06F 3/0238* (2013.01);
(Continued)

(58) Field of Classification Search
CPC .. G06F 3/04883; G06F 3/0488; G06F 3/0484; G06F 3/0482; G06F 3/0483;
(Continued)

(56) References Cited

U.S. PATENT DOCUMENTS

| 8,411,201 B2 | 4/2013 | Kang et al. |
| 2004/0135819 A1 | 7/2004 | Maa |

(Continued)

FOREIGN PATENT DOCUMENTS

| CN | 101290555 | 10/2008 |
| CN | 101404682 | 4/2009 |

(Continued)

OTHER PUBLICATIONS

Chinese Office Action dated Nov. 17, 2016 issued in counterpart application No. 201210395180.9, 29 pages.
(Continued)

*Primary Examiner* — Rayeez R Chowdhury
(74) *Attorney, Agent, or Firm* — The Farrell Law Firm, P.C.

(57) ABSTRACT

A method and an apparatus are provided for executing applications. Based on a first user input, a first window including number keys is displayed. Based on a second user input selecting a key, a second window is displayed including a list of applications. Based on an application being selected, the selected application is mapped to the selected key and an icon image corresponding to the selected application is displayed in the selected key. After the selected application is mapped, a third user input is received corresponding to the selected key. In response to the third user input, a function is performed associated with the selected application in case that a duration of the third user input is longer than or equal to a threshold duration, and an operation
(Continued)

different from the function is performed in case that the duration is shorter than the threshold duration.

19 Claims, 10 Drawing Sheets

Related U.S. Application Data continuation of application No. 16/694,395, filed on Nov. 25, 2019, now Pat. No. 10,956,367, which is a continuation of application No. 15/710,486, filed on Sep. 20, 2017, now Pat. No. 10,534,754, which is a continuation of application No. 13/653,989, filed on Oct. 17, 2012, now Pat. No. 9,773,008.

(51) Int. Cl.
*G06F 3/04886* (2022.01)
*G06F 16/14* (2019.01)
*G06F 16/242* (2019.01)

(52) U.S. Cl.
CPC ...... *G06F 3/04817* (2013.01); *G06F 3/04886* (2013.01); *G06F 16/2428* (2019.01)

(58) Field of Classification Search
CPC .............. G06F 3/04842; G06F 3/0485; G06F 3/04845; G06F 3/0486; G06F 3/0481; G06F 3/04817; G06F 16/639; G06F 16/686; G06F 3/165; G06F 3/04886; G06F 2203/04806; G06F 2203/04808; G06F 3/016; G06F 16/9535; G06F 21/6218; G06F 2203/04106; G06F 2221/2119; G06F 2221/2149; G06F 2203/04105; G06F 2203/04809; G06F 3/01; G06F 3/013; G06F 3/0346; G06F 3/038; G06F 3/0487; G06F 1/1609; G06F 1/1626; G06F 1/1632; G06F 1/1643; G06F 1/1671; G06F 16/2428; G06F 16/332; G06F 2203/04803; G06F 3/0219; G06F 3/03545; G06F 3/0393; G06F 3/041; G06F 3/0412; G06F 3/045; G06F 3/048; G06F 3/04812; G06F 3/04847; G06F 9/451

See application file for complete search history.

(56) References Cited

U.S. PATENT DOCUMENTS

| | | |
|---|---|---|
| 2006/0143578 A1 | 6/2006 | Maktedar |
| 2006/0253793 A1 | 11/2006 | Zhai |
| 2007/0018946 A1 | 1/2007 | Manley |
| 2007/0038951 A1 | 2/2007 | Danker et al. |
| 2007/0094616 A1* | 4/2007 | Won .................. H04M 1/72466 715/847 |
| 2008/0180403 A1 | 7/2008 | Park |
| 2008/0270896 A1 | 10/2008 | Kristensson |
| 2009/0170579 A1* | 7/2009 | Ishii ..................... A63F 13/5375 463/2 |
| 2010/0085313 A1* | 4/2010 | Rider ................... G06F 3/04886 345/173 |
| 2010/0115405 A1 | 5/2010 | Chang |
| 2010/0149101 A1 | 6/2010 | Guo |
| 2010/0281410 A1 | 11/2010 | Heintze |
| 2011/0115722 A1* | 5/2011 | Mok ...................... G06F 3/0236 345/173 |
| 2011/0246904 A1 | 10/2011 | Pinto et al. |
| 2012/0102528 A1 | 4/2012 | Kim |
| 2012/0123865 A1 | 5/2012 | Salzano |
| 2012/0159543 A1 | 6/2012 | Jin |
| 2012/0235921 A1 | 9/2012 | Laubach |
| 2012/0242692 A1* | 9/2012 | Laubach ............. G06F 3/04883 345/629 |
| 2012/0309464 A1* | 12/2012 | Lim .................. H04M 1/72403 455/566 |
| 2013/0145144 A1 | 6/2013 | Newell |
| 2014/0245177 A1* | 8/2014 | Maklouf ............... G06F 3/0237 715/752 |

FOREIGN PATENT DOCUMENTS

| | | |
|---|---|---|
| CN | 101631332 | 1/2010 |
| CN | 101739167 | 6/2010 |
| CN | 101739200 | 6/2010 |
| CN | 102109998 | 6/2011 |
| EP | 0 651 544 | 10/1994 |
| KR | 10-0689499 | 2/2007 |
| KR | 1020100050948 | 5/2010 |
| KR | 1020110066974 | 6/2011 |
| WO | WO 2010/040208 | 4/2010 |

OTHER PUBLICATIONS

Summons to Attend Oral Proceedings dated Feb. 13, 2017 issued in counterpart application No. 12188801.0-1952, 7 pages.
Korean Office Action dated Sep. 28, 2017 Issued in counterpart application No. 10-2011-0105795, 13 pages.
Mrtree: "Swype", Wikipedia, XP055436212, Oct. 7, 2011, 5 pages.
Dianne Hackborn: "How to Force Soft Keyboard to be Visible", XP055445476, Android Developers, Sep. 17, 2009, 2 pages.
Stefan O.: "Tastatur mit Umlauten", XP055446377, Android Forum, May 18, 2011, 15 pages.
Timo Daum: "Swipe to Umlaut", XP054978072, youtube, Nov. 20, 2010, 1 page.
European Decision to Refuse dated Apr. 10, 2018 issued in counterpart application No. 12188801.0-1222, 43 pages.

\* cited by examiner

METHOD AND APPARATUS FOR PROVIDING SEARCH FUNCTION IN TOUCH-SENSITIVE DEVICE

PRIORITY

This application is a Continuation Application of U.S. application Ser. No. 17/205,658, filed in the U.S. Patent and Trademark Office (USPTO) on Mar. 18, 2021, which is a Continuation Application of U.S. application Ser. No. 16/694,395, filed in the USPTO on Nov. 25, 2019, now U.S. Pat. No. 10,956,367, issued on Mar. 23, 2021, which is a Continuation Application of U.S. application Ser. No. 15/710,486, filed in the USPTO on Sep. 20, 2017, now U.S. Pat. No. 10,534,754, issued on Jan. 14, 2020, which is Continuation Application U.S. application Ser. No. 13/653,989, which was filed in the USPTO on Oct. 17, 2012, now U.S. Pat. No. 9,773,008, issued on Sep. 26, 2017, and claims priority under 35 U.S.C. § 119(a) to a Korean patent application filed on Oct. 17, 2011 in the Korean Intellectual Property Office and assigned Serial No. 10-2011-0105795, the contents of all of which are incorporated herein by reference.

BACKGROUND OF THE INVENTION

1. Field of the Invention

The present invention relates generally to a touch-sensitive device supporting a touch-based input and, more particularly, to a method and apparatus for providing a search function by allowing a content search function depending on a user interaction input using a virtual keypad in a touch-sensitive device having a touch screen.

2. Description of the Related Art

As a result of the remarkable growth of digital technologies, a variety of user devices capable of communication and personal information processing, based on mobility, such as a mobile communication device, a PDA (Personal Digital Assistant), a smart phone, and a tablet PC (Personal Computer), have become increasingly popular. These user devices have various essential or optional functions, such as a video call, an electronic diary, a digital camera, an e-mail service, a broadcast reception, a wireless Internet access, a music play, a scheduler, a Social Networking Service (SNS), a messenger, a dictionary, and a game, in addition to traditional inherent functions such as a voice call and a Short Message Service (SMS). Such functions are usually built-in during the manufacture of device. If necessary, a user can install a desired application having a new function by means of download through any application store.

Applications associated with various functions as mentioned above may be registered as items such as icons or widgets on a menu screen of user device, and executed when a user selects one of items. The number of such applications supported by user devices is rapidly increasing, and users' desire of using such applications is also increasing. Therefore, the number of items disposed on a menu screen of user device is rising in proportion to a rise in the number of built-in or additionally installed applications. Specifically, items of applications are arranged on a menu screen of user device.

When a user desires to execute a specific application on a menu screen, it tends to take an inordinate amount of time to find a relevant item. Specifically, since a menu screen of user device contains many applications, it becomes difficult to find a desired item and to execute a relevant application.

SUMMARY

Accordingly, the present invention is disclosed to address the above-mentioned problems and/or disadvantages and to offer at least the advantages described below.

An aspect of the present invention is to provide a method and apparatus for providing a function of more effective and faster search for contents in a touch-sensitive device.

Another aspect of the present invention is to provide a method and apparatus for allowing an easy and fast search for contents in various list views offered by a touch-sensitive device.

Still another aspect of the present invention is to a method and apparatus for supporting a dedicated keyboard for a search function in a list view of a touch-sensitive device and also for supporting a content search function based on user interactions using the dedicated keyboard.

Yet another aspect of the present invention is to a method and apparatus for realizing a faster search and selection of items associated with the execution of applications on a menu screen of a touch-sensitive device.

According to a first aspect of the present invention, an electronic device is provided for executing a plurality of applications. The electronic device includes a display and a processor. The processor is configured to, based on receiving a first user input, display a first window comprising a plurality of number keys on the display. The processor is also configured to, based on a second user input selecting one of the plurality of number keys in the first window, display a second window on the display. The second window includes a list of applications mappable to the selected number key. Each of the applications included in the list is represented by an icon image and an application name. The processor is further configured to, based on an application being selected from the list of applications in the second window, map the selected application to the selected number key and display an icon image corresponding to the selected application in the selected number key. Additionally, the processor is configured to, after the selected application is mapped to the selected number key of the plurality of number keys, receive a third user input corresponding to the selected number key. The processor is also configured to, in response to receiving the third user input, perform a function associated with the selected application in case that a duration of the third user input is longer than or equal to a threshold duration, and perform an operation different form the function in case that the duration of the third user input is shorter than the threshold duration.

According to a second aspect of the present invention a method of an electronic device is provided for executing a plurality of applications. Based on receiving a first user input, a first window including a plurality of number keys is displayed on a display of the electronic device. Based on a second user input selecting one of the plurality of number keys in the first window, a second window is displayed on the display. The second window includes a list of applications mappable to the selected number key. Each of the applications included in the list is represented by an icon image and an application name. Based on an application being selected from the list of applications in the second window, the selected application is mapped to the selected number key and an icon image corresponding to the selected application is displayed in the selected number key. After the selected application is mapped to the selected number key of the plurality of number keys, a third user input corresponding to the selected number key is received. In response to receiving the third user input, a function associated with the selected application is performed in case that a duration of the third user input is longer than or equal to a threshold duration, and an operation different from the function is performed in case that the duration of the third user input is shorter than the threshold duration.

The above methods and apparatus promote a faster and simpler search for desired items such as applications and content (including messages and media files) among items in a list view, due to a selection of only an initial character corresponding to a desired item using a dedicated keyboard provided in the list view. In particular, when selecting one of the buttons of the dedicated keyboard, a user can instantly see and selectively execute contents starting with the initial character of the selected button. Therefore, a user can perform a search and execution of a desired item in one user input action, which enhances the usability of the touch-sensitive device.

Additionally, in certain embodiments recently or frequently executed items may be automatically mapped with specific buttons (e.g., numerical buttons) of the dedicated keyboard, and related information may also be displayed. Therefore, depending on the type of interaction, a user can use such a specific button as a shortcut button for promptly executing the recently or frequently executed item or to invoke a search function based on the button.

The present invention enhances the accessibility for and usability of applications and contents which a user desires to use. Embodiments of the present invention realize an optimal environment for an item search in a touch-sensitive device, thus improving usability, convenience, and competitiveness or such a touch-sensitive device.

Another aspect of the invention provides a computer program comprising instructions arranged, when executed, to implement a method and/or apparatus in accordance with any one of the above-described aspects. A further aspect provides machine-readable storage storing such a program.

BRIEF DESCRIPTION OF THE DRAWINGS

The above and other aspects, advantages, and features of certain embodiments of the present invention will become apparent to those skilled in the art from the following detailed description taken in conjunction with the accompanying drawings, in which.

DETAILED DESCRIPTION

Embodiments of the present invention will now be described more fully with reference to the accompanying drawings. This invention may, however, be embodied in many different forms and should not be construed as limited to the embodiments set forth herein. The principles and features of this invention may be employed in varied and numerous embodiments without departing from the scope of the invention as defined by the appended claims. Although the drawings represent embodiments of the invention, the drawings are not necessarily to scale and certain features may be exaggerated or omitted in order to better illustrate and explain the present invention. Detailed descriptions of well-known functions and structures incorporated herein may be omitted for the sake of clarity and conciseness.

The present invention relates to a method and apparatus for a function of a touch-sensitive device that supports a touch-based input, to allow rapid and convenient search and execution of user's desired content in a list view screen for various contents installed or stored therein.

In an embodiment of this invention, contents include various applications installed in a touch-sensitive device, data created and stored using applications of a touch-sensitive device. For example, a list view screen may include a menu screen that represents a list of applications, a message list screen that represents a list of text messages, a file list screen that represents a list of media files (e.g., photo files, and video files). Additionally, contents may include applications of a menu screen, messages of a message list screen, and media files of a file list screen.

Figure 1:
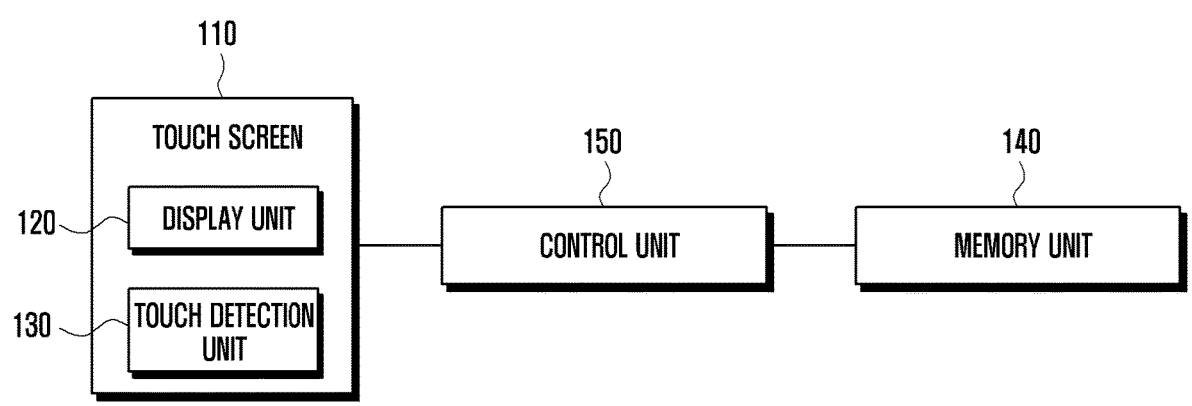
FIG. 1 illustrates the configuration of a touch-sensitive device in accordance with an embodiment of the present invention.

FIG. 1 illustrates the configuration of a touch-sensitive device in accordance with an embodiment of the present invention.

Referring to FIG. 1, a touch-sensitive device includes a touch screen 110, a memory unit 140, and a control unit 150. Additionally, the touch-sensitive device may further include an audio processing unit having a microphone and a speaker, a digital broadcasting module for receiving digital broadcasting (e.g., Digital Multimedia Broadcasting (DMB) or Digital Video Broadcasting (DVB)), a camera module for taking still images and moving images, at least one short-range communication module for supporting a communication function based on a short-range wireless communication such as Bluetooth communication, Infrared Data Association (IrDA) communication, Radio Frequency IDentification (RFID) communication, and Near Field Communication (NFC), an input unit for supporting an input based on hard keys, a Radio Frequency (RF) module for supporting communication functions such as a voice call, a video call, and a data communication, an Internet module for supporting an Internet access service based on Internet Protocol (IP), and a battery for supplying power to the above elements, which are well known in the art and hence their illustrations and descriptions will be omitted herein.

The touch screen 110 is an input and output device that simultaneously performs an input function and a display function, and has a display unit 120 and a touch detection unit 130. The touch screen 110 displays various list view screens through the display unit 120, and when user interaction is inputted through the touch detection unit 130, delivers the interaction input to the control unit 150. Then, as will be discussed later, the control unit 150 performs a content search corresponding to the interaction and outputs a result screen to the display unit 120.

The display unit 120 visually represents a variety of screens associated with the operation of the touch-sensitive device. For instance, the display unit 120 may display a lock screen, a home screen, a menu screen, various list view screens, and respective execution screens related to the execution of contents. The display unit 120 may be turned on or off under the control of the control unit 150 in the idle mode. Particularly, the display unit 120 may display a dedicated keyboard for a content search on a list view screen, as well as search information (e.g., an execution item) related to content searched according to user interaction through the dedicated keyboard. Screen examples of the display unit 120 will be described later herein.

The display unit 120 may be formed of LCD (Liquid Crystal Display) or any other display device such as LED (Light Emitting Diode), OLED (Organic LED), and AMO-LED (Active Matrix OLED). Additionally, when displaying the above execution screens, the display unit 120 may support a screen display in a landscape mode, a screen display in a portrait mode, and an adaptive screen switch display between both modes, depending on rotation or direction of the touch-sensitive device.

The touch detection unit 130 may be placed on the display unit 120 and detect user interaction inputs (e.g., a touch interaction, a tap interaction, or a drag interaction) made from a contact on the surface of the touch screen 110. When detecting any user interaction on the surface of the touch screen 110, the touch detection unit 130 detects coordinates of the interaction and delivers the detected coordinates to the control unit 150. Specifically, the touch detection unit 130 detects an interaction input made by a user, creates a signal associated with the detected interaction, and transmits the signal to the control unit 150. Based on the signal from the touch detection unit 130, the control unit 150 may perform a particular function corresponding to a region on which the interaction occurs. Particularly, the touch detection unit 130 may receive a user interaction for a content search from a dedicated keyboard provided on a list view screen of the touch-sensitive device.

The memory unit 140 stores a variety of applications and data executed and processed in the touch-sensitive device and may be formed of one or more non-volatile memories and volatile memories. Specifically, the memory unit 140 may be formed of at least one of ROM (Read Only Memory), flash memory, RAM (Random Access Memory), HDD (Hard Disk Drive), external hard disk drive, and portable storage medium. The memory unit 140 may store permanently or temporarily the OS (Operating System) of the touch-sensitive device, programs and data related to input and display control operations using the touch screen 110, programs and data related to a search function using a dedicated keyboard of the touch-sensitive device.

Particularly, the memory unit 140 may store content mapping information for respective buttons, execution items for respective contents, etc. in connection with list view screens, contents, and shortcut buttons of the dedicated keyboard. The execution items are shortcut items that invoke selected content such as applications, sent or received messages, or media files, and then display an execution screen of the selected content.

The control unit 150 controls the entire operations of the touch-sensitive device. The control unit 150 may control the operations related to a search function using a dedicated keyboard in a list view provided in an embodiment of this invention.

Particularly, while a list view screen is displayed, the control unit 150 may control a display of the dedicated keyboard for a content search in response to user's request. The control unit 150 may perform a content search within a list view according to any interaction input based on the dedicated keyboard. Specifically, using the first letter of a button selected by user interaction in the dedicated keyboard, the control unit 150 may perform a content search within a list view.

Additionally, the control unit 150 may output search results by correlating them with the dedicated keyboard. For example, the control unit 150 may output at least one execution item associated with one or more searched contents through a pop-up window on a button selected by the interaction. In response to a user interaction for an execution item provided in the pop-up window, the control unit 150 may control the execution of content associated with the execution item. An interaction defined for content execution may be a release of a current interaction (inputted for a content search) from a specific execution item in the pop-up window or a new interaction for selecting another specific execution item in the pop-up window.

The control unit 150 may register recently executed contents (or user selected contents) per specific button (e.g., numeral button) of the dedicated keyboard and control a display of related execution items. In this case, the control unit 150 may perform a function of a shortcut button or a search function according to the type of interaction made on the registered button.

For example, when any interaction input less than a predefined time is detected from a specific button mapped with content, the control unit 150 may recognize it as a command of a shortcut button function and then promptly execute specific content mapped with the button. Also, when any interaction input more than a predefined time is detected from a specific button mapped with content, the control unit 150 may recognize it as a command of a search function and then control a content search based on character corresponding to the button.

As discussed above, the control unit 150 controls the entire operations in connection with functions of this invention and detailed descriptions thereof will be made later herein.

In addition to the above-discussed functions, the control unit 150 may control typical functions of the touch-sensitive device and related operations. For example, when a specific application is executed, the control unit 150 may control the operation thereof and a related screen display, may receive input signals corresponding to various touch event inputs supported in a touch-based input interface and control related functions, and may control transmission and reception of various data based on wired or wireless communications.

The touch-sensitive device of this invention shown in FIG. 1 may include any types of electronic devices, multimedia players, and their application equipment, which support functions of this invention. For example, including mobile communication terminals based on various communication protocols corresponding to various communication systems, the touch-sensitive device may include tablet PCs (Personal Computers), smart phones, digital cameras, PMPs (Portable Multimedia Players), media players, portable game consoles, laptop computers, PDAs (Personal Digital Assistants). A function control method of this invention may be applied to various touch-based display devices such as digital TV, DS (Digital Signage), LFD (Large Format Display), a laptop computer, etc.

Figure 2:
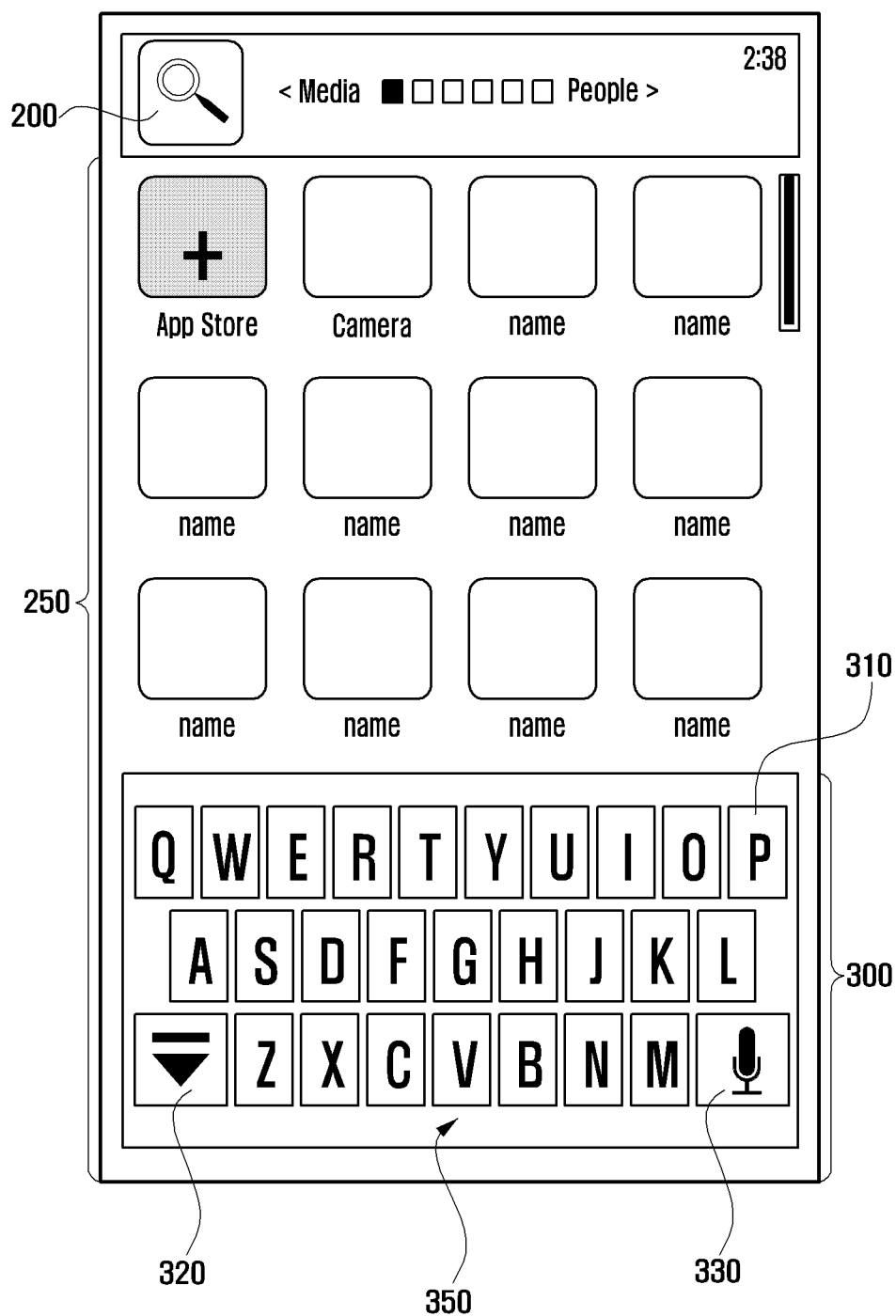
FIG. 2 illustrates a screen interface for supporting a search function in a touch-sensitive device in accordance with an embodiment of the present invention.

FIG. 2 illustrates a screen interface for supporting a search function in a touch-sensitive device in accordance with an embodiment of the present invention.

Referring to FIG. 2, the screen interface for supporting a search function may have a list view region 250 and a dedicated keyboard region 300. The list view region 250 represents a list of specific contents. The dedicated keyboard region 300 is provided in the list view region 250 and represents a dedicated keyboard 350 used for inputting interactions for a content search and for offering search results. The dedicated keyboard region 300 may be freely disposed at a lower part, a middle part, or an upper part of a list view screen according to user setting.

Additionally, the screen interface may include a search item 200 for invoking and displaying the dedicated keyboard 350 in the dedicated keyboard region 300 on the list view screen. Alternatively, instead of offering the search item 200 through the screen interface, it is possible to provide a hardware function key for performing a function (i.e., invocation and display of the dedicated keyboard 350) of the search item 200 to any position (e.g., a side) of the touch-sensitive device. In this case, the search item 200 may be removed from the screen interface.

The dedicated keyboard 350 may include buttons 310 for creating a search word corresponding to a user interaction, a hiding item 320 for hiding the dedicated keyboard 350 from the list view screen, and a microphone item 330 for supporting a voice-based content search. The dedicated keyboard 350 is specialized for content search and execution, and hence may have a layout of alphanumeric buttons only (to which numerical, alphabetical, and/or vernacular symbols are assigned) without normal control buttons (e.g., buttons of backspace, enter, space, shift, and caps lock). In some cases, the hiding item 320 and the microphone item 330 may also be removed from the dedicated keyboard 350.

The dedicated keyboard 350 may represent one or more execution items offered as search results and correlated with a specific button selected by a user interaction. Also, depending on user setting, the dedicated keyboard 350 may represent execution items for selected contents (e.g., recently executed contents or user selected contents) on specific buttons (e.g., numeral buttons).

As discussed above, the screen interface for supporting a search function is composed of a content list view that shows contents in a page or list form, and the dedicated keyboard 350 for a content search within the list view. The dedicated keyboard 350 may appear in the content list view when a user selects the search item 200 provided on the list view screen.

When a user selects one of the alphanumeric buttons 310 of the dedicated keyboard 350, contents starting from a character (e.g., alphabet, number, vernacular, and vernacular initial phoneme) assigned to the selected button may be searched. As a result, execution items for N (N is natural number) numbers of searched contents may be provided through a pop-up window on the selected button. Then a user may select one of the execution items in order to execute desired content.

Figure 3:
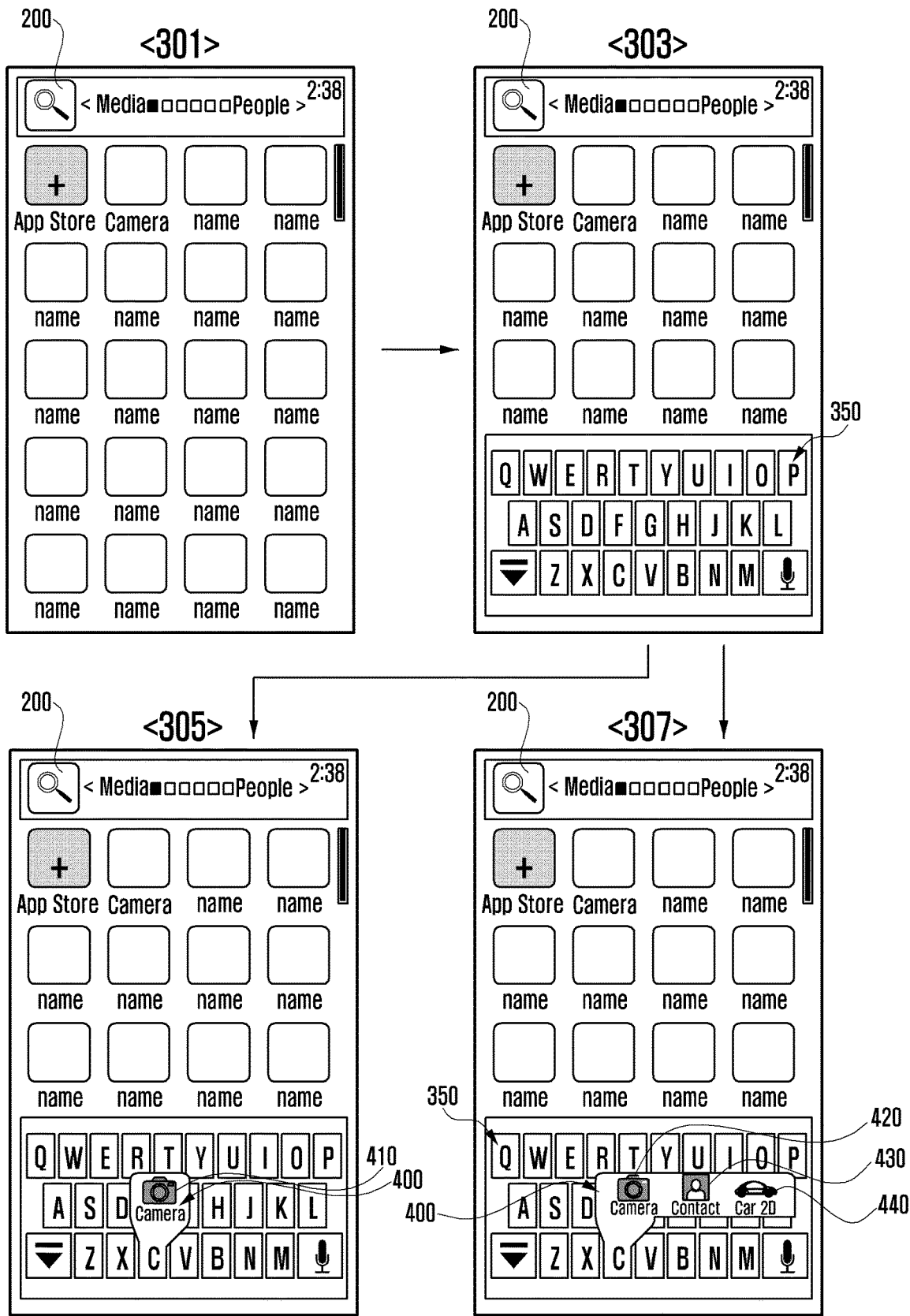
FIG. 3 illustrates screen shots associated with a content search based on a search-dedicated keyboard in a touch-sensitive device in accordance with an embodiment of the present invention.

FIG. 3 illustrates screen shots associated with a content search based on a search-dedicated keyboard in a touch-sensitive device in accordance with an embodiment of the present invention.

Referring to FIG. 3, as shown in stage 301, a list view screen is displayed containing a plurality of contents, each of which may be an application, a message, or a media file. Therefore, a list view may correspond to a list view of applications, a list view of messages, or a list view of media files.

In this stage 301, a user may input an interaction for selecting the search item 200 that is provided at a part of the list view screen, which interaction may be a tap type interaction inputted on the search item 200.

When any interaction input is detected through the search item 200 during a display of a list view, the touch-sensitive device may display the dedicated keyboard 350 on the list view as shown in stage 303. The dedicated keyboard 350 may be composed of alphanumeric buttons.

In this stage 303, a user may input a search interaction for searching contents. For example, in the dedicated keyboard 350, a user may select a specific alphanumeric button to which the first character of desired content is assigned. This search interaction may be a tap type interaction by which a specific button is selected or released, or a touch type interaction by which selection of a specific button is maintained. These types of a search interaction may be determined according to user setting. Herein, it is presumed that a search interaction is a touch type. Therefore, a search interaction may be maintained on a specific alphanumeric button of the dedicated keyboard 350.

When a search interaction is detected through a selected alphanumeric button of the dedicated keyboard 350, the touch-sensitive device may perform a content search based on a specific character assigned to the selected button. For example, the touch-sensitive device may perform a search for contents starting from the character of the selected button among all contents in the list view. Then the touch-sensitive device may output search information related to searched contents through a pop-up window on the dedicated keyboard 350.

For example, if a single content is found, the touch-sensitive device may provide an execution item 410 corresponding to the found content through a pop-up window 400 as shown in stage 305. If several contents are found, the touch-sensitive device may provide execution items 420, 430 and 440 corresponding to the found contents through the pop-up window 400 as shown in stage 307.

As shown in stage 305, if the only one content is found, the execution item 410 that allows a prompt execution of the content may be displayed on the pop-up window 400. This execution item 410 may be in icon form and/or a text that identifies the found content.

For example, if a list view is an application list view (e.g., a menu screen) in which applications are arranged, and if a search interaction is inputted on a button to which character "C" is assigned, the only one application "camera" may exist as applications starting from "C" among all applications in the list view. In this case, as shown in stage 305, the execution item 410 represented as a combination of icon and text about the found content "camera" may be displayed through the pop-up window 400, which may have a form correlated with the button "C" selected by a search interaction. Alternatively, the pop-up window 400 may be located at any other position within the dedicated keyboard 350 or at any position in the list view.

Although not illustrated in FIG. 3, when only one content is found through a search, the above-discussed stage 305 may be omitted and the found content may be directly executed.

As shown in stage 307, if several contents are found, the execution items 420, 430 and 440 each of which allows a prompt execution of relevant content may be displayed on the pop-up window 400. Each of these execution items 420, 430 and 440 is in icon and/or text form that identifies the found content.

For example, if a list view is an application list view (e.g., a menu screen) in which applications are arranged, and if a search interaction is inputted on a button to which character "C" is assigned, three applications "camera", "contact" and "car2D" may exist as applications starting from "C" among all applications in the list view. In this case, as shown in stage 307, the execution items 420, 430 and 440 represented as combinations of icon and text about the found contents "camera", "contact" and "car2D" may be displayed through the pop-up window 400. The pop-up window 400 may have the form correlated with the button "C" selected by a search interaction, or may be located at any other position within the dedicated keyboard 350 or at any position in the list view.

As shown in the above-discussed stages 305 and 307, search results of contents may be provided as execution items 410, 420, 430 and 440 through the pop-up window 400. Then a user may input a next interaction on one of the execution items in order to execute a desired content. A related description will be made later herein.

Figure 4:
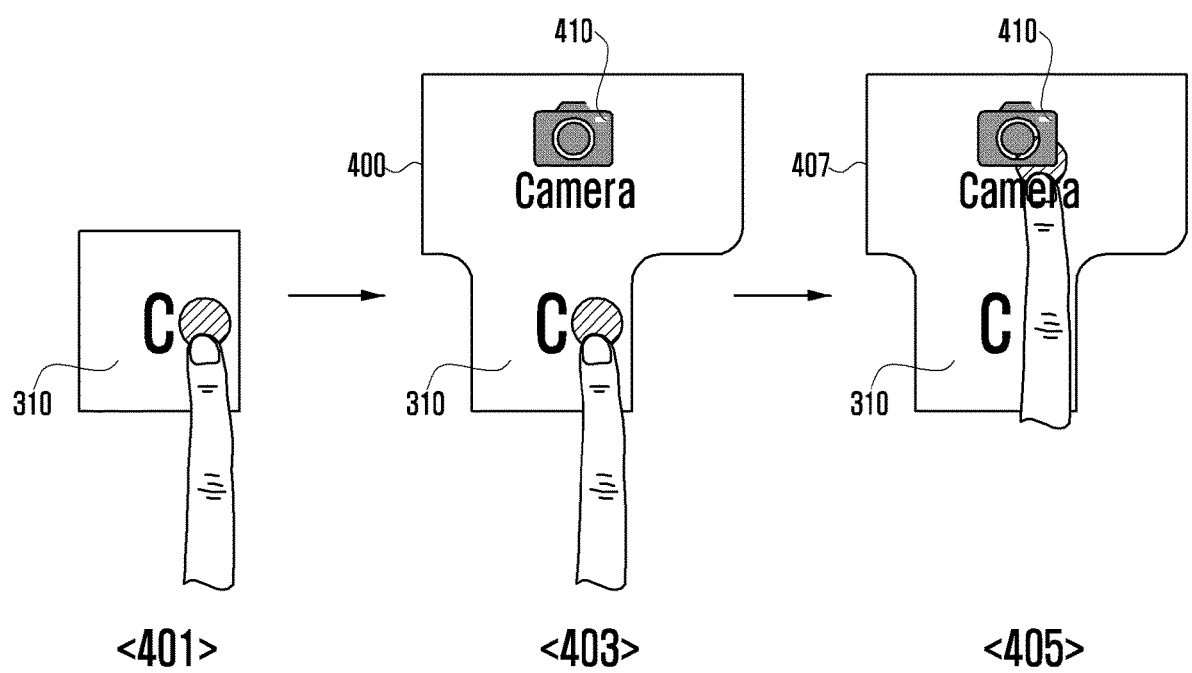
FIG. 4 illustrates partial screen shots associated with user manipulations when a single content is found as search results in a touch-sensitive device in accordance with an embodiment of the present invention.

FIG. 4 illustrates partial screen shots associated with user manipulations when a single content is found as search results in a touch-sensitive device in accordance with an embodiment of the present invention.

In FIG. 4, presuming that content is one of several applications, the dedicated keyboard 350 for searching contents (i.e., applications) is provided on the list view of applications, and a user interaction is inputted on a "C" button of the dedicated keyboard 350.

Referring to FIG. 4, as shown in stage 401, an interaction for a content search is inputted on the "C" button 310 of the dedicated keyboard 350. In response to the interaction on the "C" button 310, the touch-sensitive device may search applications starting from character "C" among all applications in the list view. If only one content "camera" is found, the touch-sensitive device may output the execution item 410 of "camera" through the pop-up window 400 as shown in stage 403.

The pop-up window 400 may have the form of speech bubble correlated with the "C" button 310 as shown in stage 403. While the pop-up window 400 is displayed, a search interaction may be maintained on the "C" button.

In order to select the found application "camera" in stage 403, a user may move the current interaction from the "C" button 310 to the execution item 410 in the pop-up window 400 as shown in stage 405. Also, in order to execute the "camera" application in stage 405, a user may release the current interaction from the execution item 410.

When detecting a release of interaction on the execution item 410 in the pop-up window 400, the touch-sensitive device may recognize the release of interaction as a command to execute the "camera" application corresponding to the execution item 410. Specifically, in response to an interaction release on the execution item 410, the touch-sensitive device may execute the "camera" application corresponding to the execution item 410 and display a related execution screen. When the execution screen of the "camera" application is displayed, the dedicated keyboard 350 may be removed (i.e., disappears) and the execution screen may be provided as a full screen.

Meanwhile, although not illustrated in FIG. 4, if only one content is found through a search, the found content (i.e., an application corresponding to the execution item 410) may be executed in response to a release of interaction from the selected character button in the state of the above-discussed stage 403.

Figure 5:
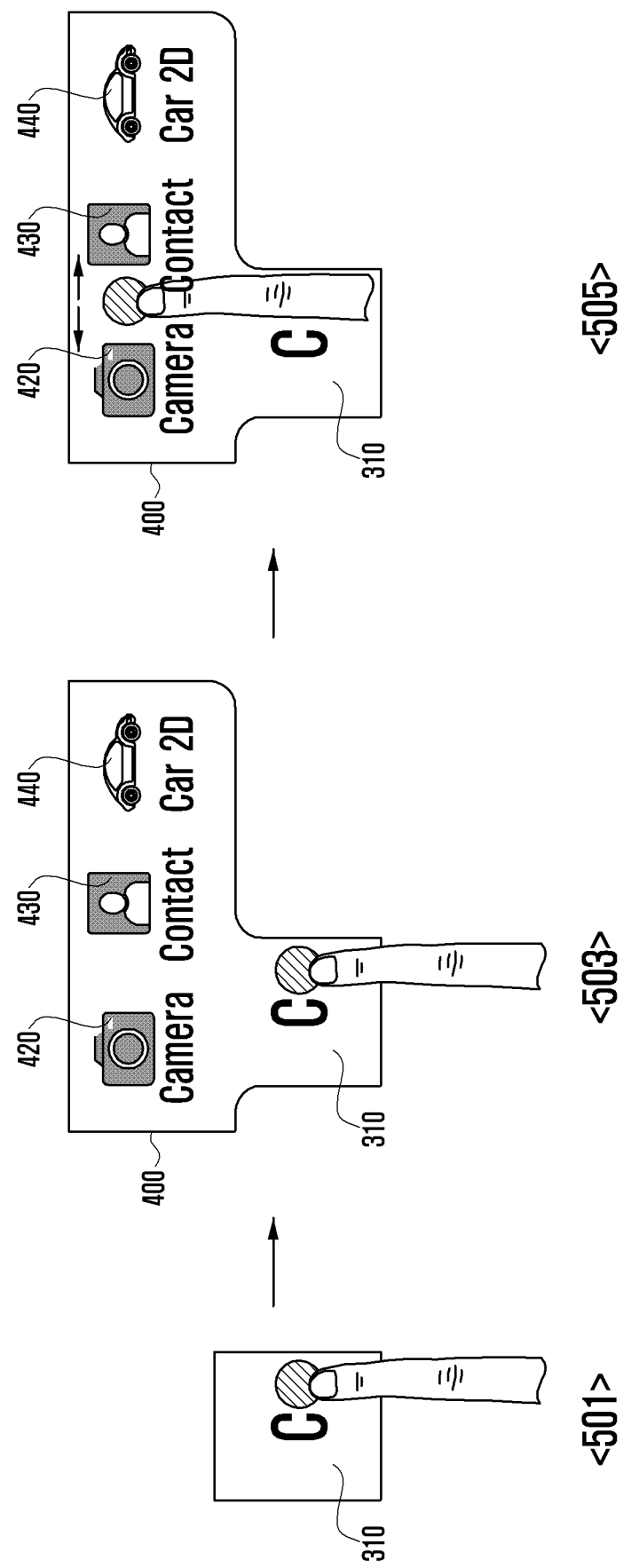
FIG. 5 illustrates partial screen shots associated with user manipulations when several contents are found as search results in a touch-sensitive device in accordance with an embodiment of the present invention.

FIG. 5 illustrates partial screen shots associated with user manipulations when several contents are found as search results in a touch-sensitive device in accordance with an embodiment of the present invention.

In FIG. 5, presuming that contents are applications, the dedicated keyboard 350 for searching contents (i.e., applications) is provided on the list view of applications, and a user interaction is inputted on a "c" button of the dedicated keyboard 350.

Referring to FIG. 5, as shown in stage 501, an interaction for a content search is inputted on the "C" button 310 of the dedicated keyboard 350. In response to the interaction on the "C" button 310, the touch-sensitive device may search applications starting from character "C" among all applications in the list view. If three contents "camera", "contact" and "car2D" are found, the touch-sensitive device may output the execution items 420, 430 and 440 of "camera", "contact" and "car2D" through the pop-up window 400 as shown in stage 503.

The pop-up window 400 may have the form of speech bubble correlated with the "C" button 310 as shown in stage 503. Also, while the pop-up window 400 is displayed, a search interaction may be maintained on the "C" button.

In order to select one of the found applications "camera", "contact" and "car2D" in stage 503, a user may move the current interaction from the "C" button 310 to a desired one of the execution items 420, 430 and 440 in the pop-up window 400 as shown in stage 505. A user may move right and left the current interaction along a row of execution items so as to select a desired item. In order to execute a desired application, a user may release the current interaction from one of the execution items 420, 430 and 440.

When detecting a release of interaction on a selected one of execution items 420, 430 and 440 in the pop-up window 400, the touch-sensitive device may recognize the release of interaction as a command to execute a particular application corresponding to the selected execution item. Specifically, in response to an interaction release on a selected execution item, the touch-sensitive device may execute a particular application corresponding to the selected execution item and display a related execution screen. When the execution screen of the selected application is displayed, the dedicated keyboard 350 may be removed (i.e., disappears) and the execution screen may be provided as a full screen.

Although not illustrated in FIG. 5, if more contents are found, the size of the pop-up window 400 may be increased, as shown in stages 503 and 505. For example, the pop-up window 400 may be expanded to accommodate two rows of execution items for the found contents. Specifically, the size of the pop-up window 400 used for displaying the execution items may be adaptively varied (expanded or reduced) depending on the number of found contents. The minimum size of the pop-up window corresponds to a size capable of containing the only one execution item.

Although FIGS. 3 to 5 illustrate instances when at least one content is found, however, the present invention is not limited thereto. If there is no found content, the pop-up window 400 may not be displayed or displayed with a blank region for execution items.

Figure 6:
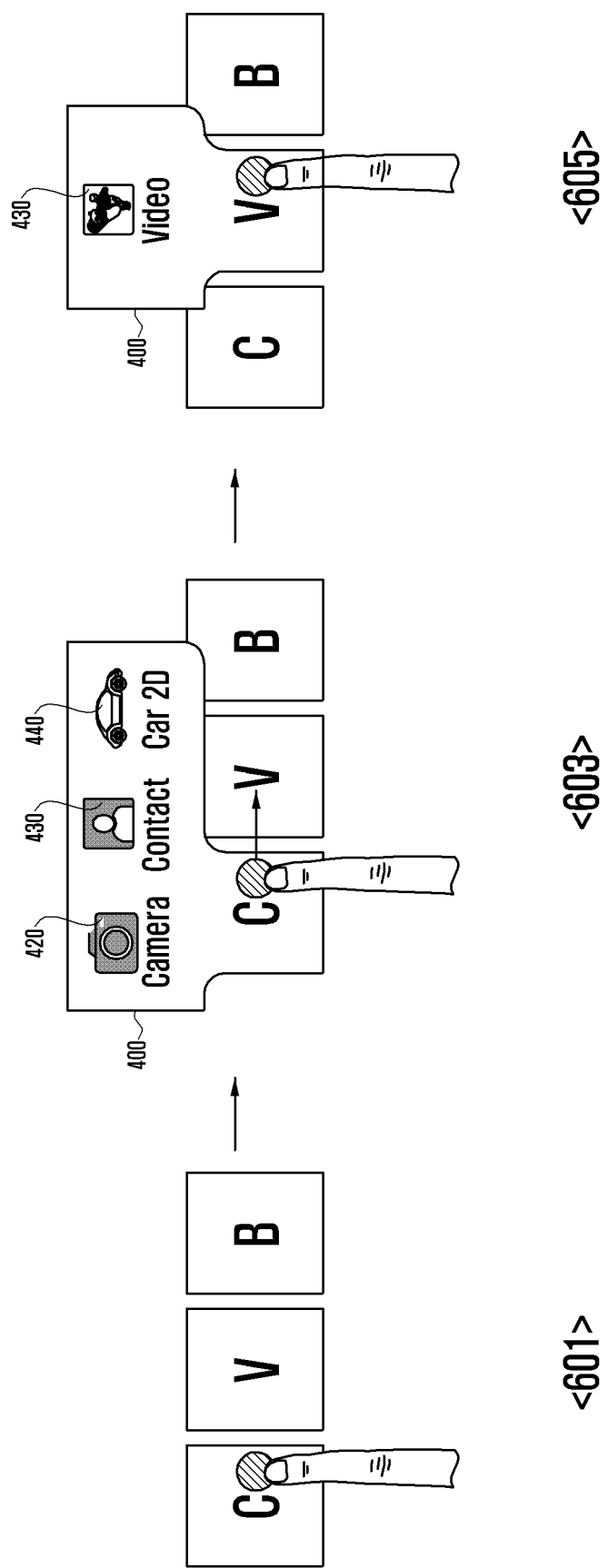
FIG. 6 illustrates partial screen shots associated with user manipulations on a dedicated keyboard used for a content search in a touch-sensitive device in accordance with an embodiment of the present invention.

FIG. 6 illustrates partial screen shots associated with user manipulations on a dedicated keyboard used for a content search in a touch-sensitive device in accordance with an embodiment of the present invention.

Referring to FIG. 6, as shown in stage 601, the dedicated keyboard 350 partially has an arrangement of three sequential alphanumeric buttons "C", "V" and "B". An interaction for a content search is inputted on the "C" button.

In response to the interaction on the "C" button, the touch-sensitive device may search contents starting from character "C" among all contents (e.g., applications) in the list view. If three contents "camera", "contact" and "car2D" are found, the touch-sensitive device may output the execution items 420, 430 and 440 of "camera", "contact" and "car2D" by correlating the pop-up window 400 with the "C" button as shown in stage 603.

For another content search (e.g., a search for contents starting from character "V"), in stage 603, a user may move the current interaction from the "C" button to the "V" button as shown in stage 605.

In response to the interaction on the "V" button, the touch-sensitive device may search contents starting from character "V" among all contents (e.g., applications) in the list view. If a single content "video" is found, the touch-sensitive device may output the execution item 440 of "video" by correlating the pop-up window 400 with the "V" button as shown in stage 605.

As discussed above, when a user inputs an interaction on a selected alphanumeric button in the dedicated keyboard 350, a search process may be performed for contents starting from a specific character assigned to the selected button. Execution items associated with found contents may then be displayed through a pop-up window on the selected button.

If the current interaction is moved from the selected button to another button for a new selection while the pop-up window is displayed on the currently selected button, the pop-up window correlated with the currently selected button may be removed (i.e., a display of search results is canceled) and a new pop-up window that contains execution items found depending on a character of the newly selected button may be displayed on the newly selected button.

Meanwhile, instead of moving the current interaction between buttons, a new interaction may be inputted on another button after the current interaction is released from the currently selected button.

Figure 7:
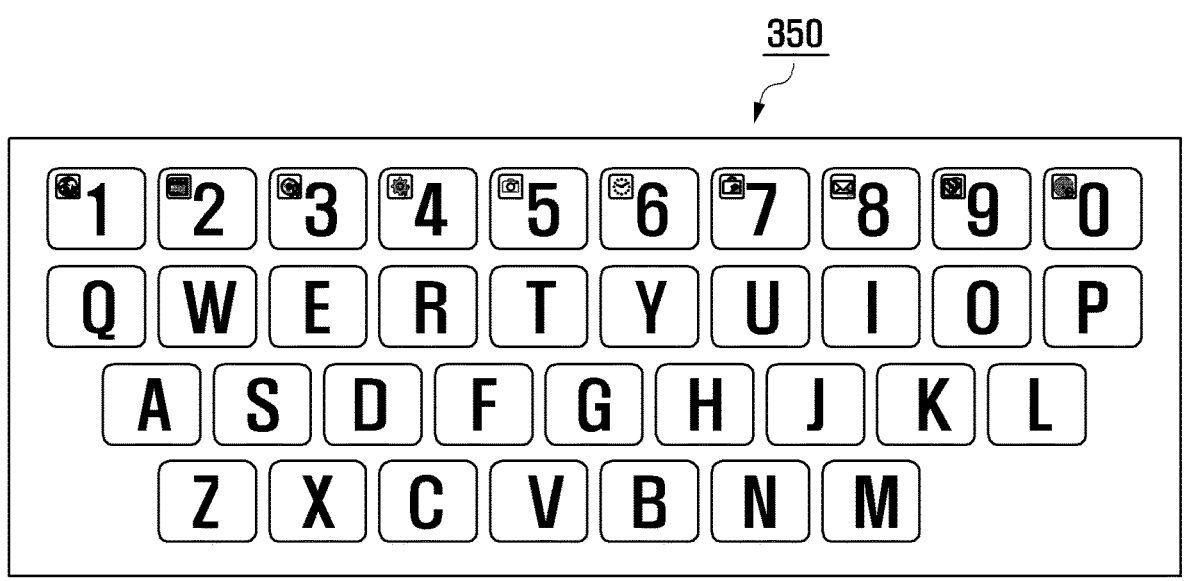
FIG. 7 illustrates a dedicated keyboard supported by a touch-sensitive device in accordance with an embodiment of the present invention.

FIG. 7 illustrates a dedicated keyboard supported by a touch-sensitive device in accordance with an embodiment of the present invention.

As shown in FIG. 7, the dedicated keyboard 350 is composed of a plurality of alphanumeric buttons (to which numerical, alphabetical, and/or vernacular symbols are assigned) for creating a search word corresponding to a user interaction. This dedicated keyboard 350 is specialized for content search and execution, so that alphanumeric buttons only may be arranged without any normal control buttons (e.g., backspace, enter, space, shift, and caps lock buttons).

Although not illustrated in FIG. 7, the dedicated keyboard 350 may further have a hiding item for hiding the dedicated keyboard 350 and a microphone item for supporting a voice-based content search.

Additionally, as shown in FIG. 7, the dedicated keyboard 350 may automatically register recently executed contents in each numeral button by using a specific button (e.g., a numeral button) and display related execution items. This allocation of contents using numeral buttons may be based on recently executed contents, frequently used contents, or user defined contents. Specifically, contents may be registered in the numeral buttons of the dedicated keyboard 350 in the recently executed order, the frequently used order, or the user defined order. For example, contents may be sequentially allocated to numeral buttons "1", "2", . . . , "0" in the frequently used order and related execution items may be respectively represented in the numeral buttons.

When contents are mapped with specific buttons of the dedicated keyboard 350, a function of shortcut button or a search function may be selectively performed depending on types of interaction inputted on the buttons.

For example, when any interaction (e.g., a tap type interaction based on interaction input and release) is inputted less than a predefined time on specific buttons, a shortcut button function may be performed to promptly execute a specific content mapped with the selected button. Also, when any interaction (e.g., a long press type interaction or a touch and hold type interaction) is inputted more than a predefined time on specific buttons, a search function may be performed to control a content search based on a character corresponding to the selected button.

As discussed above, specific buttons (e.g. numeral buttons) of the dedicated keyboard 350 may be used to register particular contents (e.g., recently executed, frequently used, or user defined) therein and display related information (e.g., execution items) thereon. Therefore, a user may use such buttons as shortcut buttons or search invocation buttons.

Figure 8:
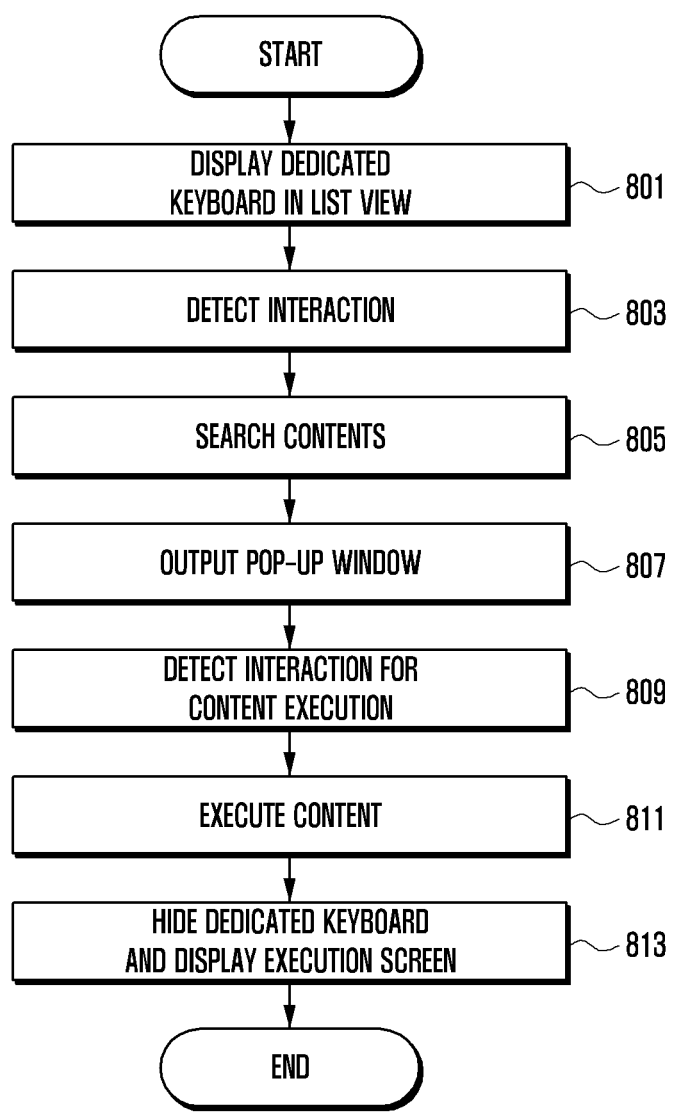
FIGS. 8 to 10 illustrate a method for providing a search function using a dedicated keyboard in a touch-sensitive device in accordance with embodiments of the present invention.

FIG. 8 illustrates a method for providing a search function using a dedicated keyboard in a touch-sensitive device in accordance with an embodiment of the present invention.

Referring to FIG. 8, the control unit 150 controls a display of the dedicated keyboard 350 for a content search on a list view in step 801. For example, while the list view in which a list of user requested contents (e.g., applications, messages, and media files) is displayed, the control unit 150 may control a display of the dedicated keyboard 350 in the dedicated keyboard region 300 of the list view in response to user request, such as when detecting a selection of the search item 200 in the list view or a selection of a corresponding function key.

The control unit 150 detects an interaction input from one of alphanumeric buttons that constitute the dedicated keyboard 350 in step 803.

When any interaction is detected from one of the alphanumeric buttons of the dedicated keyboard 350, the control unit 150 may perform a content search based on the character assigned to that button in step 805. For example, the control unit 150 may identify the particular character assigned to a selected button of the dedicated keyboard 350 and then search contents starting from the identified character in the list view.

The control unit 150 outputs the result of content search through the pop-up window 400 in step 807. For example, the control unit 150 may represent the execution items associated with found contents through the pop-up window 400 correlated with the selected button of the dedicated keyboard 350. The only one or several contents may be found as search results, so that the pop-up window 400 may contain one or more execution items displayed therein. If no content is found through search, the pop-up window 400 may be provided with a blank or not displayed.

The control unit 150 may detect an interaction input for content execution in step 809. For example, when an interaction inputted on a specific alphanumeric button of the dedicated keyboard 350 is moved to any execution item of the pop-up window 400 and then released, the control unit 150 may recognize it as an interaction for content execution based on the execution item. Alternatively, when a new interaction is inputted on any execution item of the pop-up window 400 after a release of a previous interaction on the alphanumeric button, the control unit 150 may recognize it as an interaction for content execution based on the execution item.

The control unit 150 may control a content execution process based on the selected execution item in response to the interaction for content execution in step 811. Then the control unit 150 may hide the dedicated keyboard 350 and control a display of execution screen for the executed content in step 813.

Figure 9:
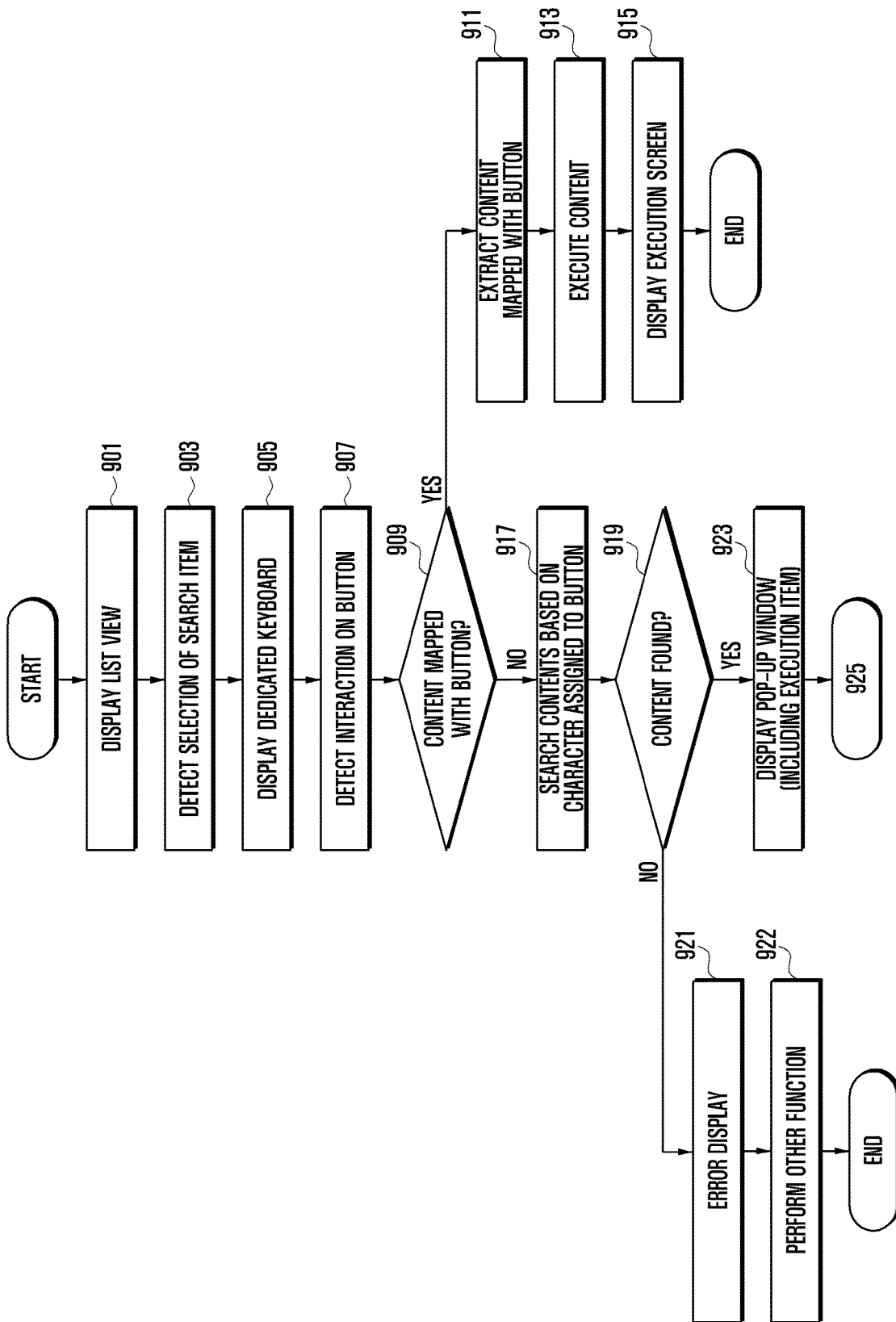
Figure 10:
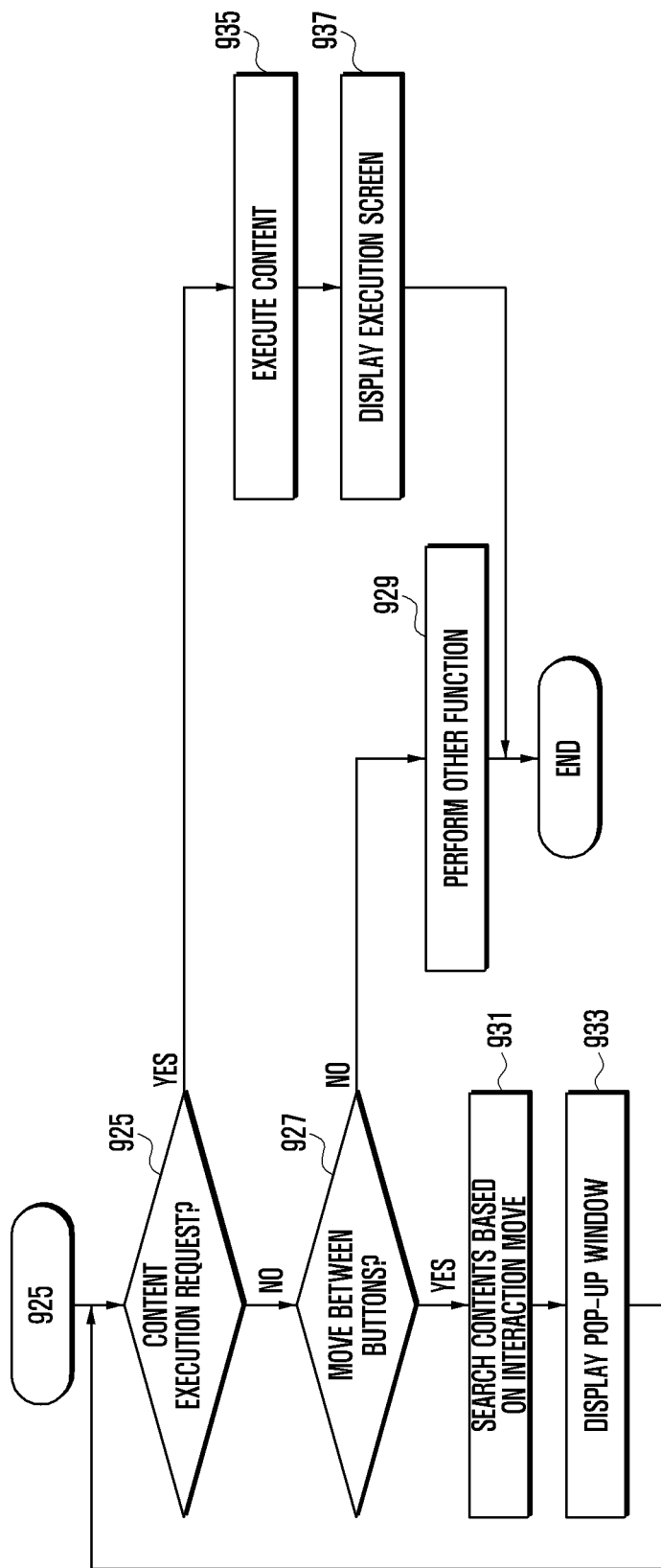

FIGS. 9 and 10 illustrate a method for providing a search function using a dedicated keyboard in a touch-sensitive device in accordance with another embodiment of the present invention.

Referring to FIGS. 9 and 10, the control unit 150 may control a display of a list view in which a list of user requested contents (e.g., applications, messages, and media files) is provided in step 901. While the list view is displayed, the control unit 150 may detect a selection of the search item 200 for invoking a search function in step 903.

When the search item 200 is selected by a user, the control unit 150 may output the dedicated keyboard 350 to be used for searching contents in the list view in step 905. In this step, the control unit 150 may control the dedicated keyboard 350 to be displayed in the dedicated keyboard region 300 partially assigned to the list view. When there is any content mapped with at least one alphanumeric button of the dedicated keyboard 350, the control unit 150 may control a display of any execution item to be used for executing a specific content mapped with the selected button.

The control unit 150 may detect an interaction input from any alphanumeric button of the dedicated keyboard 350 in step 907, and then determine whether there is content mapped with the detected button in step 909.

If there is any content mapped with the interaction inputted button (Yes branch of step 909), the control unit 150 may extract that content in step 911. Then the control unit 150 may execute the extracted content in step 913, and control a display of related execution screen in step 915. Depending on the type of interaction inputted on the button, the control unit 150 may perform a search function to be discussed below rather than perform a shortcut button function of steps 911 to 915.

If there is no content mapped with the interaction inputted button (No branch of step 909), or if the interaction is for a search function even though there is any content mapped with the interaction inputted button, the control unit 150 may perform a content search process based on the character assigned to the inputted button in step 917. For example, the control unit 150 may identify the particular character assigned to the interaction inputted button of the dedicated keyboard 350 and then search contents starting from the identified character in the list view.

The control unit 150 may determine whether there is any content found through search in step 919. Specifically, the control unit 150 may determine whether contents starting from the identified character exist in the list view.

If there is no found content (No branch of step 919), the control unit 150 may control an error display in step 921. For example, the control unit 150 may display the pop-up window 400 with a blank or not display the pop-up window 400.

After an error display, the control unit 150 may perform a particular function in step 922, such as a content search based on a new alphanumeric button to which a current interaction is moved, or initialization of the above-discussed search process at a user's request.

If there is any found content (Yes branch of step 919), the control unit 150 may control a display of the pop-up window 400 containing at least one execution item based on the found content in step 923.

While the pop-up window 400 is displayed, the control unit 150 may determine whether there is a request for executing the content in step 925. Specifically, the control unit 150 may determine whether any interaction is inputted for a content execution based on the execution item. For example, when the current interaction inputted on the alphanumeric button is moved to and released from the execution item in the pop-up window 400, the control unit 150 may recognize it as an interaction for a content execution.

If there is no request for a content execution (No branch of step 925), the control unit 150 may determine whether an interaction is moved between the buttons in step 927. For example, when the pop-up window is displayed together with a specific button of the dedicated keyboard 350 in response to an interaction inputted on the button, the control unit 150 may determine whether the interaction is moved to another button.

If there is no movement of interaction between the buttons (No branch of step 927), the control unit 150 may perform a particular function in step 929. For example, when a release interaction is detected on the button, the control unit 150 may initialize a search function and control a display of the initial screen (e.g., step 905). Alternatively, if the only one content is found as discussed above, the control unit 150 may control a prompt execution of found content in response to a release of interaction.

If there is a movement of interaction between the buttons (Yes branch of step 927), the control unit 150 may cancel a display of the pop-up window on the former button and perform a new content search based on the character of the latter button to which the interaction is moved in step 931. Then the control unit 150 may control a display of a new pop-up window 400 containing the execution items of newly found contents by correlating with the latter button in step 933.

If there is a request for a content execution (Yes branch of step 925), the control unit 150 may control a content execution based on the execution item in response to such a request in step 935. Then the control unit 150 may hide the dedicated keyboard 350 and control a display of execution screen for the executed content in step 937.

Although the above-discussed embodiment is for when contents are applications and hence a list view of applications is provided, this is only an example and not to be considered as a limitation of the present invention. Alternatively, the present invention may be applied to other types of contents that constitute another list view. For example, the touch-sensitive device may provide a dedicated keyboard for a message search in a message list view, search received or sent messages starting from a specific character mapped with a selected button of the dedicated keyboard, output search results through a pop-up window, execute a particular message selected in the pop-up window, and display a related execution screen.

The touch-sensitive device may also provide a dedicated keyboard for a media file search in a media file list view, search media files starting from a specific character mapped with a selected button of the dedicated keyboard, output search results through a pop-up window, execute a particular media file selected in the pop-up window, and display a relate execution screen. Similarly, the present invention may be used for a function of content search in various content list views available for the touch-sensitive device.

The present invention is described herein with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general or special purpose computer, or other programmable data processing apparatus to produce a machine, such that the instructions, which are executed via the processor of the computer or other programmable data processing apparatus, create means for implementing the functions specified in the flowchart block(s).

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may be executed concurrently, or in reverse order, depending upon the functionality involved.

It will be appreciated that embodiments of the present invention can be realized in the form of hardware, software or a combination of hardware and software. Any such software may be stored in the form of volatile or non-volatile storage such as, for example, a ROM, whether erasable or rewritable, or in the form of memory such as RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith.

It will also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While this invention has been particularly shown and described with reference to embodiments thereof, it will be understood by those skilled in the art that various changes in form and details may be made therein without departing from the spirit and scope of the invention as defined by the appended claims.

What is claimed is:

1. An electronic device for executing a plurality of applications, the electronic device comprising:
  a display; and
  a processor configured to:
    based on receiving a first user input, display a first window comprising a plurality of number keys on the display;
    based on a second user input selecting one of the plurality of number keys in the first window, display a second window on the display, the second window comprising a list of applications mappable to the selected number key, wherein each of the applications included in the list is represented by an icon image and an application name;
    based on an application being selected from the list of applications in the second window, map the selected application to the selected number key and display an icon image corresponding to the selected application in the selected number key;
    after the selected application is mapped to the selected number key of the plurality of number keys, receive a third user input corresponding to the selected number key; and
    in response to receiving the third user input:
      perform one of a function associated with the selected application and an operation having a name that includes a character assigned to the selected number key, in case that the third user input is a press and hold input having a first duration longer than or equal to a threshold duration, and
      perform the other of the function and the operation, in case that the third user input is a press input having a second duration shorter than the threshold duration.

2. The electronic device of claim 1, wherein the processor is further configured to display, in response to the selected application being mapped to the selected number key, the selected number key with the remaining number keys of the plurality of number keys.

3. The electronic device of claim 1, wherein the icon image is displayed in the selected number key.

4. The electronic device of claim 1, wherein the icon image includes a number corresponding to the selected number key.

5. The electronic device of claim 1, wherein the second window is displayed adjacent to the first window.

6. The electronic device of claim 1, wherein the first window overlays an image displayed on the display.

7. The electronic device of claim 1, wherein the processor is further configured to:
   in response to receiving the third user input, determine whether an application is mapped to the selected number key, and
   in response to determining that the application is mapped to the selected number key, execute the application mapped to the selected number key.

8. The electronic device of claim 1, wherein each of the applications included in the list of the second window is selectable for being mapped specifically to the selected number key.

9. The electronic device of claim 1, wherein:
   each respective application name, included in the list, is separate from and not part of a corresponding icon image; and
   while the icon image, corresponding to the selected application, is displayed on the selected number key, the application name corresponding to the selected application is omitted from being displayed on the selected number key.

10. A method of an electronic device for executing a plurality of applications, the method comprising:
    based on receiving a first user input, displaying a first window comprising a plurality of number keys on a display of the electronic device;
    based on a second user input selecting one of the plurality of number keys in the first window, displaying a second window on the display, the second window comprising a list of applications mappable to the selected number key, wherein each of the applications included in the list is represented by an icon image and an application name;
    based on an application being selected from the list of applications in the second window, mapping the selected application to the selected number key and displaying an icon image corresponding to the selected application in the selected number key;
    after the selected application is mapped to the selected number key of the plurality of number keys, receiving a third user input corresponding to the selected number key; and
    in response to receiving the third user input:
      performing one of a function associated with the selected application and an operation having a name that includes a character assigned to the selected number key, in case that the third user input is a press and hold input having a first duration longer than or equal to a threshold duration, and
      performing the other of the function and the operation, in case that the third user input is a press input having a second duration shorter than the threshold duration.

11. The method of claim 10, further comprising displaying, in response to the selected application being mapped to the selected number key, an icon image indicating the mapped application with the remaining number keys of the plurality of number keys.

12. The method of claim 10, wherein the icon image is displayed in the selected number key.

13. The method of claim 10, wherein the icon image includes a number corresponding to the selected number key.

14. The method of claim 10, wherein the second window is displayed adjacent to the first window.

15. The method of claim 10, wherein the first window overlays an image displayed on the display.

16. The method of claim 10, further comprising:
    in response to receiving the third user input, determining whether an application is mapped to the selected number key; and
    in response to determining that the application is mapped to the selected number key, executing the application mapped to the selected number key.

17. The method of claim 10, wherein each of the applications included in the list of the second window is selectable for being mapped specifically to the selected number key.

18. The method of claim 10, wherein:
    each respective application name, included in the list, is separate from and not part of a corresponding icon image; and
    while the icon image, corresponding to the selected application, is displayed on the selected number key, the application name corresponding to the selected application is omitted from being displayed on the selected number key.

19. An electronic device for executing a plurality of applications, the electronic device comprising:
    a display; and
    a processor configured to:
      based on receiving a first user input, display a first window comprising a plurality of number keys on the display;
      based on a second user input selecting one of the plurality of number keys in the first window, display a list of applications mappable to the selected number key, wherein each of the applications included in the list is represented by an icon image and an application name;
      based on an application being selected from the list of applications in a second window, map the selected application to the selected number key and display an icon image corresponding to the selected application in the selected number key;
      after the selected application is mapped to the selected number key of the plurality of number keys, receive a third user input corresponding to the selected number key; and
      in response to receiving the third user input:
        perform one of a function associated with the selected application and an operation having a name that includes a character assigned to the selected number key, in case that the third user input is a press and hold input having a first duration longer than or equal to a threshold duration, and
        perform the other of the function and the operation, in case that the third user input is a press input having a second duration shorter than the threshold duration.

* * * * *